United States Patent

[11] 3,610,838

[72] Inventor Toshihiko Numakura
Tokyo, Japan
[21] Appl. No. 805,144
[22] Filed Mar. 7, 1969
[45] Patented Oct. 5, 1971
[73] Assignee Sony Corporation
Tokyo, Japan
[32] Priority Mar. 11, 1968
[33] Japan
[31] 43/16021

[54] ERASING APPARATUS FOR MAGNETIC MEMORY DISCS USING TWO DC HEADS

6 Claims, 5 Drawing Figs.

[52] U.S. Cl. 179/100.2D
[51] Int. Cl. G11b 5/02, G11b 25/04
[50] Field of Search 179/100.2 D; 317/157.51

[56] References Cited

UNITED STATES PATENTS

| | | | |
|---|---|---|---|
| 2,594,934 | 4/1952 | Kornei | 179/100.2 |
| 2,766,328 | 10/1956 | Handschin et al. | 179/100.2 |
| 2,784,259 | 3/1957 | Camras | 179/100.2 |
| 3,321,586 | 5/1967 | Krones | 179/100.2 |

*Primary Examiner*—Bernard Konick
*Assistant Examiner*—Robert S. Tupper
*Attorneys*—Albert C. Johnston, Robert E. Isner, Lewis H. Eslinger and Alvin Sinderbrand

ABSTRACT: In a magnetic recording and reproducing apparatus having a magnetic disk on which a signal is magnetically recorded in a spiral or other track, erasing of the signal is effected by at least one pair of angularly spaced erasing heads when relative rotation of the disk and heads is effected simultaneously with the supplying to the heads of a DC current which decreases progressively with time and which causes the heads to produce magnetic fields of opposite polarity and progressively decreasing intensity.

INVENTOR.
TOSHIHIKO NUMAKURA
BY
[signature]
ATTORNEY.

ERASING APPARATUS FOR MAGNETIC MEMORY DISCS USING TWO DC HEADS

This invention relates generally to a magnetic recording and reproducing apparatus of the type having a magnetic disk on which one or more signals are magnetically recorded in a spiral or other track extending around the center of the disk, and more particularly is directed to an improved erasing device for magnetically erasing the magnetically recorded signal or signals from such disk.

Apparatus of the above-described type has been used for magnetically recording and reproducing high frequency signals, for example, video signals having a frequency in the range between about 1 and 4 M. Hertz, for which use it is necessary to rotate the magnetic disk or sheet at an extremely high speed. When an AC erasing device has been employed to erase the high-frequency signal magnetically recorded on the sheet or disk, the alternating magnetic field for erasing the recorded signal has had to have a frequency that is very substantially higher than the high frequency of the recorded signal so that a great amount of electric power is required for producing the alternating magnetic erasing field and a complex arrangement is required for producing the erasing field. On the other hand, when existing DC saturated erasing devices have been employed for erasing the high frequency signal from the magnetic disk or sheet, so as to reduce the electric power required for erasing, the erasing function is not performed as efficiently as with an AC erasing device, that is, a residual magnetic field remains on the magnetic disk or sheet with the result that there is an increase in the magnetic noise when a signal is again recorded on the disk.

Accordingly, it is an object of this invention to provide an erasing device for a magnetic recording and reproducing apparatus of the described character, which erasing device avoids the above mentioned disadvantages of the devices previously employed for erasing high frequency signals from the magnetic disk.

More specifically, it is an object of this invention to provide an erasing device requiring relatively little electric power for its operation, and which is effective to completely remove the recorded signal from the magnetic disk so that there is substantially no residual magnetic field on the latter.

A further object is to provide an erasing device having the foregoing characteristics and which is simple in construction.

In accordance with an aspect of this invention, a signal magnetically recorded in a spiral or other track extending around the center of a magnetic disk is erased by effecting relative rotation of the disk and a pair of angularly spaced erasing heads while supplying to the heads a DC current which decreases progressively with time and which causes the heads to produce magnetic fields of opposite polarity and progressively decreasing intensity.

The above, and other objects, features and advantages of the invention, will be apparent in the following detailed description of an illustrative embodiment thereof which is to be read in connection with the accompanying drawing, wherein.

Figure 1:
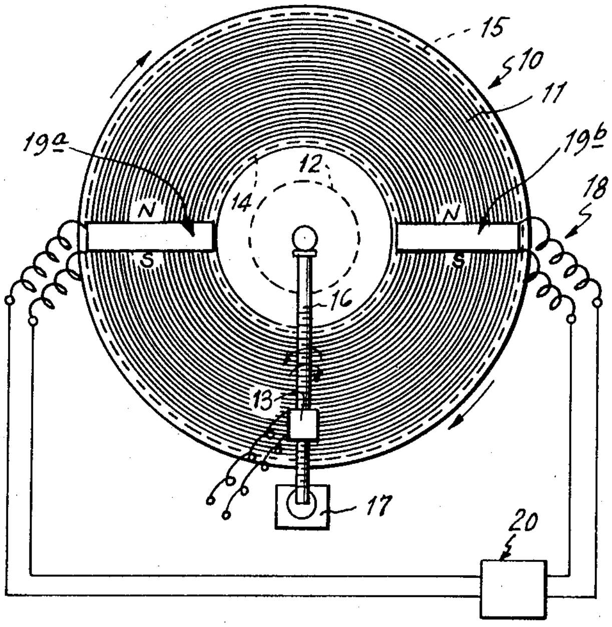
FIG. 1 is a schematic plan view of the essential components of a magnetic recording and reproducing apparatus having an erasing device in accordance with an embodiment of this invention.

Referring to the drawing in detail, and initially to FIG. 1 thereof, it will be seen that a recording and reproducing apparatus 10 of the type to which the present invention may be applied generally comprises a magnetic disk or sheet 11 rotated, as by a motor 12, and a magnetic recording and reproducing head 13 which is made to move radially over the surface of disk 11 during recording and reproducing or playback so that the head records a signal in, and reproduces that signal from a spiral track extending, for example, between the inner and outer peripheries 14 and 15 of the recording area on the disk 11. As shown, the radial movement of head 13 during recording and reproducing of a signal may be effected by a screw 16 which extends radially with respect to disk 11 and which is suitably rotated, as by a drive 17, upon rotation of the magnetic disk.

In accordance with this invention, the magnetic recording and reproducing apparatus 10 is provided with an erasing device 18 for removing the signal magnetically recording in the spiral track on disk 11 and which generally comprises at least one pair of erasing heads 19*a* and 19*b* and a power supply 20 for energizing the erasing heads.

Figure 2:
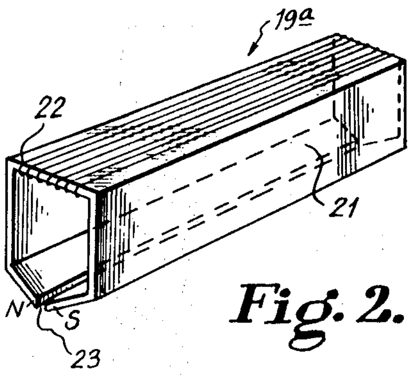
FIG. 2 is a schematic perspective view of one of the erasing heads included in the erasing device.

As shown on FIG. 2, each of erasing heads 19*a* and 19*b* includes an elongated core 21, which may be of ordinary ferrite, and a coil 22 wound on the core to produce a magnetic field across the gap 23 of the core when a current is passed through coil 22. In accordance with this invention, the erasing heads 19*a* and 19*b* produce fields of opposite polarities, for example, either by winding the respective coils 22 in opposite directions on the cores 21, or by passing the energizing current in opposite directions through the coils 22 of the heads 19*a* and 19*b*. Further, the cores 21 of the heads 19*a* and 19*b* are of sufficient length so as to extend radially over the full recording area of disk 11, that is, overt the full recording area of disk 11, that is, over the radial distance between the peripheries 14 and 15 which represent the innermost and outermost convolutions of the spiral recording track.

The erasing heads 19*a* and 19*b* are suitably mounted adjacent disk 11 so as to extend radially with respect to the latter at angularly space locations, for example, at locations spaced apart by 180°, as shown, and with both heads traversing substantially the same radial extent of the magnetic disk. The mounting of heads 19*a* and 19*b* is adapted for relative rotation of disk 11 and heads 19*a* and 19*b* as a unit. Thus, where disk 11 is rotated, as by motor 12, heads 19*a* and 19*b* may be fixedly mounted. Conversely, heads 19*a* and **19 *b* may be mounted for rotation, as a unit, about the center of disk 11** while the latter is at rest.

Figure 3:
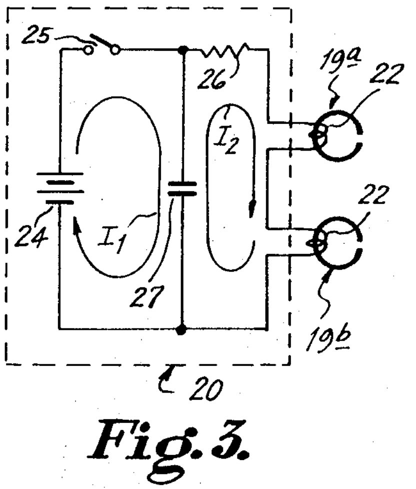
FIG. 3 is a wiring diagram of a circuit that may be used to supply a progressively decreasing DC current to the erasing heads in accordance with this invention.

In accordance with this invention, during relative rotation of disk 11 and heads 19*a* and 19*b* power supply 20 produces a DC current which decreases progressively with time and which is passed through coils 22 of heads 19*a* and 19*b* so that the respective magnetic fields resulting from such current are of opposite polarity, as mentioned above, and of progressively decreasing intensity. As shown particularly on FIG. 3, the power supply 20 may simply comprise a source 24 of DC voltage across which the coils 22 of heads 19*a* and 19*b* are connected in series with each other and also in series with a switch 25 and a resistor 26, and a capacitor 27 which is connected in parallel with resistor 26 and the head coils 22.

Figure 4:
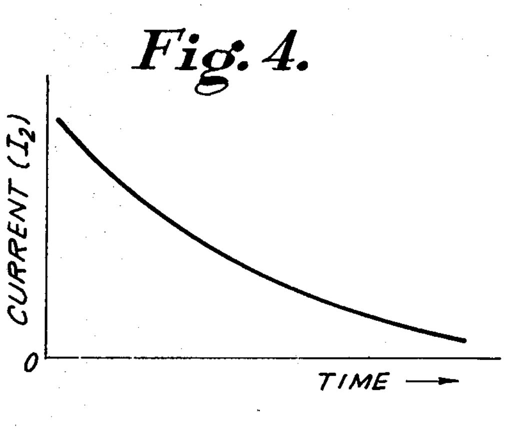
FIG. 4 is a graph illustrating the relation of erasing head current to time with the circuit of FIG. 3.
Figure 5:
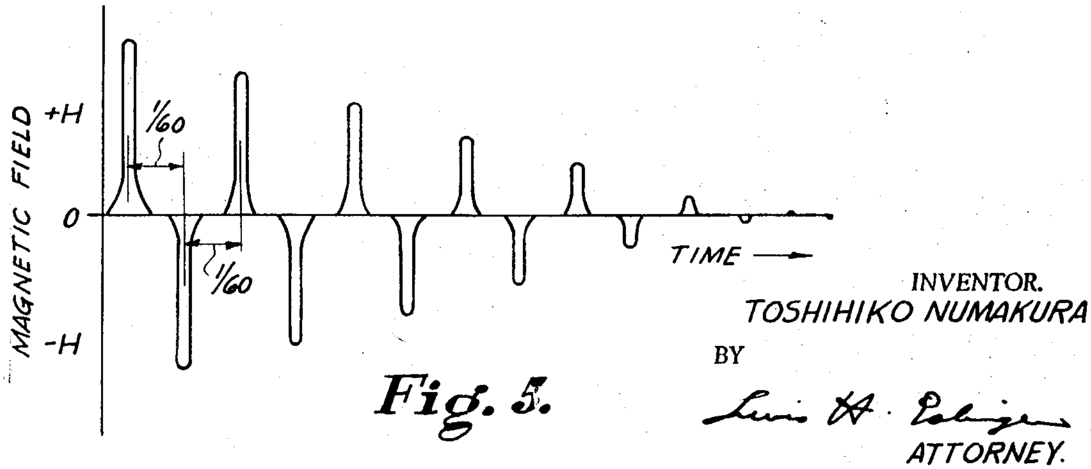
FIG. 5 is a graph showing the alternating magnetic field of progressively decreasing intensity that is produced at any point on the magnetic disk so as to erase the signal therefrom upon operation of the erasing device according to this invention.

When switch 25 is closed, capacitor 27 is charged by the current I, up to a voltage which should be sufficient to cause heads 19*a* and 19*b* to produce a magnetic field of adequate intensity to saturate the magnetic material of disk 11. When switch 25 is subsequently reopened, the charge on capacitor 27 causes a DC current $I_2$ to flow through resistor 26 and erasing head coils 22 in series. As in shown on FIG. 4, the current $I_2$ decreases progressively, for example, exponentially, with time in accordance with a time constant that depends upon the capacitor 27 and upon the combined resistance of resistor 26 and coils 22. Preferably, such time constant is selected so that the time for the decay of the current $I_2$ from its maximum value to zero is equivalent to the time required for 10 to 60 revolutions of magnetic disk 11. Thus, for example, if motor 12 drives disk 11 at a rotational speed of 30 revolutions per second, as is generally the case in a magnetic recording and reproducing apparatus for a video signal or other similarly high frequency signal, each point or increment of the spiral track in which the signal has been recorded passes the heads 19*a* and 19*b* alternately at a frequency of 60 passes per second. Hence as shown on FIG. 5, each increment of the track is exposed, every 1/60th of a second, to a magnetic field produced by one or the other of heads 19*a* and 19*b*, with the successively encountered fields being alternately of opposite polarities and progressively reducing in intensity down to zero, for example, after 10 to 60 revolutions of the disk. It will be apparent that each point or increment of the spiral track is subjected similarly to a series of fields of alternately opposite polarities and of decreasing intensity, so that the signal previously recorded in the track is erased. The extent to which such erasing of the signal is achieved is comparable to that obtained with AC erasing devices, but with far less expenditure of electric power than has been required by previous DC erasing devices. Further, there is no residual magnetic field remaining on the disk so that magnetic noises do not occur when a signal is subsequently recorded thereon. Further, it will be apparent that the structure of the described erasing device is simple and hence relatively inexpensive.

In the foregoing, the erasing device according to the invention has been described as having a pair of erasing heads spaced by 180° , but it is apparent that such angle may be varied, and further that two or more pairs of the erasing heads may be employed.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention.

What is claimed is:

1. In a magnetic recording and reproducing apparatus including a magnetic disc for storing signals magnetically recorded thereon in at least one track extending around the center of said disc, an erasing device comprising at least one pair of erasing heads, mounting means mounting said heads adjacent said disc and permitting relative rotation of said disc and heads, said erasing heads being located relative to each at positions that are angularly spaced about said center of the disc and both traversing substantially the same radial extent of said disc within which said track lies, each of said erasing heads including core means and coil means thereon to produce an erasing magnetic field upon the passage of a DC current through said coil means, means operative to produce a DC current which decreases progressively from a maximum to zero in a predetermined time and which is supplied to the coil means of said erasing heads so that the respective resulting magnetic fields are of opposite polarity and progressively decreasing intensity, and means for effecting said relative rotation of the disc and heads at a speed to cause from 10 to 60 relative revolutions thereof in said predetermined time, whereby, during said relative rotations of said disc and heads simultaneously with the production of said progressively decreasing DC current, each incremental portion of said track is exposed alternately to magnetic fields of opposite polarity and progressively decreasing intensity, for erasing a signal recorded therein.

2. A magnetic recording and reproducing apparatus according to claim 1, in which said erasing heads are fixed and said disk is rotatable relative thereto.

3. A magnetic recording and reproducing apparatus according to claim 1, in which said erasing heads of said pair are angularly spaced apart by 180°.

4. A magnetic recording and reproducing apparatus according to claim 1, in which said coil means are wound in opposite directions on the core means of said erasing heads of said pair, and said progressively decreasing DC current is passed in the same direction through said oppositely wound coil means.

5. A magnetic recording and reproducing apparatus according to claim 1, in which said means operative to produce the progressively decreasing DC current includes a source of DC voltage, switch means for connecting said coil means of the erasing heads in series with said source, resistance means in series with said coil means and a capacitor connected in parallel across said coil means and said resistance means as that upon clôsing of said switch means, said capacitor is charged from said source and, upon reopening of said switch means, discharging of said capacitor causes the progressively decreasing current to flow in said coil means for said time determined by said resistance means.

6. A magnetic recording and reproducing apparatus according to claim 1, in which a recording head is provided which moves radially with respect to said disk during recording of a signal on the rotated disk so that said track is in the form of a spiral on said disk, and said core means of each of said erasing heads extends radially over said disk for a distance of at least as large as the radial distance between the inner and outer ends of said spiral track.